April 28, 1964     R. B. ERB ETAL     3,130,940

HEAT SHIELD

Filed Aug. 5, 1963     2 Sheets-Sheet 1

INVENTORS
Richard B. Erb
Kenneth C. Weston

BY

ATTORNEYS

INVENTORS
Richard B. Erb
Kenneth C. Weston
BY
ATTORNEYS

United States Patent Office 3,130,940
Patented Apr. 28, 1964

3,130,940
HEAT SHIELD
Richard B. Erb and Kenneth C. Weston, Houston, Tex., assignors to the United States of America as represented by the Administrator of the National Aeronautics and Space Administration
Filed Aug. 5, 1963, Ser. No. 300,113
16 Claims. (Cl. 244—1)
(Granted under Title 35, U.S. Code (1952), sec. 266)

The invention described herein may be manufactured and used by the Government of the United States of America for governmental purposes without the payment of any royalties thereon or therefor.

This invention relates in general to thermal protection and more particularly to heat shields for interplanetary space vehicles.

When a space vehicle enters a planetary atmosphere it has a large amount of kinetic energy which must be disposed of in a controlled manner if the vehicle is to survive. A large fraction of this energy is transferred to the atmosphere as kinetic energy and heat energy. However, the remainder of the energy, which apears as the aerodynamic heat input to the vehicle, is of such magnitude that its disposal constitutes a major problem in space flight.

The major source of the heat input to the vehicle is a region of high temperature gas known as the shock layer which is formed upon the vehicle's entry into the atmosphere. The gas from the shock layer flows around the vehicle and heat is transferred from the gas to the vehicle in the form of both radiative heat and convective heat.

In orbital and lunar vehicles, due to their comparatively low reentry speed and the resultant lower temperature of the shock layer, the radiative heat from the shock layer constitutes only about one percent and ten percent, respectively, of the total heat to the vehicle and has not constituted a major problem. However, at entry speeds such as may be encountered with interplanetary vehicles, the radiative heat from the shock layer will constitute a significantly greater percentage of the total heat to the vehicle. For example, it is estimated that for a vehicle entering the Earth's atmosphere from Mars, up to ninety percent of the heat input to the vehicle could be radiative heat. Most of this radiative heat would occur early in time during reentry since it is primarily a function of velocity and, of course, velocity is highest during the initial stages of reentry. Thus, interplanetary vehicles must deal effectively with a substantial amount of radiative heat during the initial stage of reentry, as well as with the usual substantial amount of convective heat which occurs subsequent to the initial stage of reentry.

One method of protecting the interior of space vehicles from reentry heat has been to use metallic heat shields. These shields afford protection in one of two principal ways, in acting as a heat sink by absorbing and retaining large quantities of heat within the body of the metallic shield, or in radiating heat away from the vehicle. Copper, for example, was used on early ballistic missiles as a heat sink but to absorb heat greater than about 10,000 B.t.u/square foot would require a shield so heavy that it would be unsuitable for space vehicle applications. An example of a good metallic radiator heat shield of the present state of the art is molybdenum, but molybdenum can oly radiate at rates up to about 40 B.t.u./square foot/second.

Because of the limited capability of metallic heat shields extensive research has led to the use of ablation materials which, as a heat shield, perform more satisfactorily under conditions of extreme heat. One type of ablation material is the ceramics, wherein the aerodynamic heating of the virgin material causes it to flow as a liquid near the surface and part of this liquid layer is subsequently vaporized and dispersed by the airstream over the vehicle surface. Quartz ablation shields of this kind which are used on Intercontinental Ballistic Missile (ICBM) nose cones behave in this manner. During ablation, heat is dissipated as latent heat in the phase change and is also transported away from the surface by convection in the liquid and gas layers.

Another type of ablation material is a composite of phenolic, epoxy, or similar resin reinforced with Fiberglas, asbestos, or other refractory fiber in the form of either random or oriented fibers, or in the form of a tape, ribbon, cloth, or felt, etc. The ablation shield for the Mercury spacecraft, for example, is a plastic of phenolic-Fiberglas cloth. After ablation has started in such a material several layers will be formed. The lowest layer, which is adjacent to the vehicle structure, is virgin material. Above the virgin material there is a pyrolysis zone in which the phenolic resin starts to pyrolyze and form a char which accumulates to form a thick layer which is retained by the reinforcing material. The exposed surface of this reinforced char undergoes melting, vaporization, and oxidation and these effects, together with areodynamic shear and pressure forces, limit the growth of the char layer. Within the char conduction of heat inwards toward the pyrolysis zone is partly offset by the transpiration of gases outward to the surface and the subsequent introduction of these relatively cool gases into the external flow provides cooling. Since the char has a high carbon content it can sustain high surface temperatures and radiate an appreciable amount of heat. Moreover, since pyrolysis takes place at a relatively low temperature, little conduction of heat takes place within the virgin material.

The success of the ablation shield of the type used in present space vehicles results from the fact that (1) it is not heating-rate limited, (2) it can dispose of a large amount of heat for a small amount of material loss and, (3) the low conductivity of the material retards heat transfer to the interior of the vehicle.

As previously pointed out, for a vehicle entering the Earth's atmosphere from Mars, up to ninety percent of the heat input to the vehicle could be radiative heat. The convective heat, which is the remainder of the total heat input, would nevertheless be much greater than the entire heat input to a lunar or orbital vehicle upon entry. Therefore, at the extremely high temperatures present in the shock layer of an interplanetary vehicle upon entry into a planetary atmosphere, conventional heat shields, such as heat sinks and ablative shields, are not able to dispose of the enormous amounts of heat input to the vehicle without being made extremely heavy. By reducing the weight of the heat shield, less power would be needed to launch the vehicle and more essential equipment needed for a prolonged mission, such as food supplies and electronics equipment, could be carried.

In order to overcome many of the attendant disadvantages of prior art heat shields and to provide a heat shield which is effective in handling large amounts of radiative heat as well as convective heat, the heat shield of the present invention is constructed so that each component of heat is handled in an optimum manner. A highly reflective layer is provided on an outer member of the vehicle for reflecting radiative heat which is emitted toward the vehicle. Further, an ablative structure which is transparent to radiative heat is mounted over the reflective layer for dissipating convective heat. Thus, during the initial stages of entry into an atmosphere when radiative heat is the greatest portion of heat input to the heat shield, the radiant heat passes through the ablative structure and is reflected by the reflecting layer. During subsequent stages of entry, as the convective component becomes substantial, it is dissipated by the ablative structure. Thus the present invention thereby provides a compact structure, the total weight of which is substantially less than that of a conventional heat shield.

More specifically, according to one embodiment of the invention, the heat shield is secured to the forebody of the vehicle where the greatest amount of heat will be transferred to the vehicle. The portion of the shield exposed to the atmosphere is an ablative material formed into a structure having a cellular arrangement which is transparent to radiative heat. The ablative material allows the initial radiative heat to pass and be reflected by a metallic reflecting inner layer positioned behind the ablative structure, and subsequently dissipates the convective heat transferred to the vehicle. Each of the cells of the cellular arrangement has a relatively thick top wall and thin side walls which are attached at the bottom to the reflecting layer. Due to relatively thin construction of the side walls, conduction of the convective component of heat toward the surface will be minimized. A thin gap separates the adjacent side walls of each of the cells so as to allow expansion of the cells as they heat. The reflecting layer is mounted on a heat sink which has a contour similar to the bulkhead of the vehicle. The heat sink, which also provides the structural rigidity for the heat shield, is used to absorb heat which may not be completely dissipated by the ablative structure or reflected by the reflecting layer. The heat sink need only be a relatively thin member as compared to the size of a heat sink which would be needed to absorb all of the heat input to the vehicle. A plurality of stiffeners are provided which space the heat sink from the bulkhead. Further a layer of insulating material is interposed between the bulkhead and the heat sink to further retard the transfer of heat from the shield to the vehicle.

The advantages of this invention, both as to its construction and mode of operation, will be readily appreciated as the same become better understood by reference to the following detailed description when considered in connection with the accompanying drawings in which like reference numerals designate like parts throughout the figures and wherein.

Figure 1:
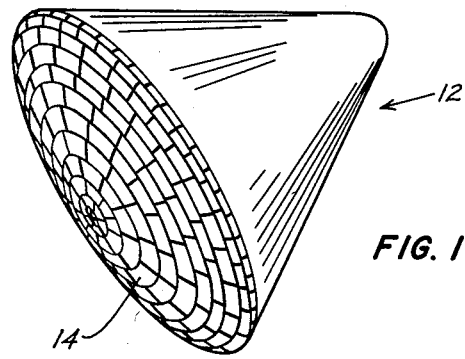
FIG. 1 is a perspective view of a space vehicle embodying the novel heat shield in accordance with this invention.
Figure 2:
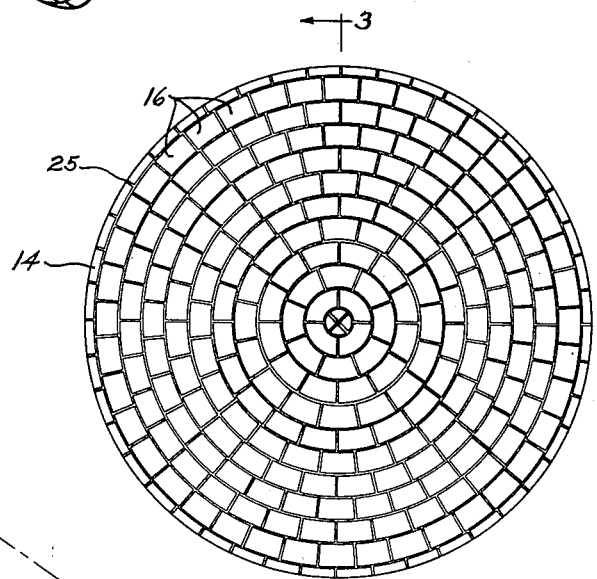
FIG. 2 is an enlarged bottom view of the space vehicle of FIG. 1 depicting the arrangement of the heat shield in greater detail.
Figure 3:
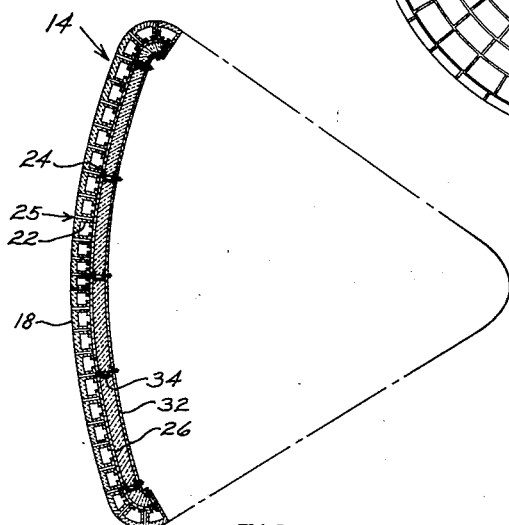
FIG. 3 is a side view, partly in section, taken along the line 3—3 of FIG. 2.
Figure 4:
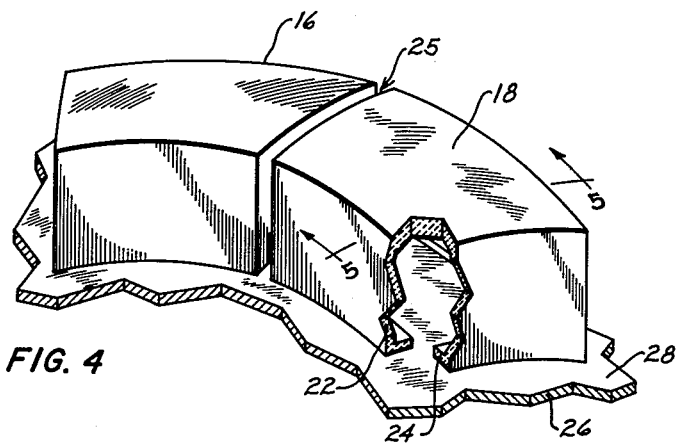
FIG. 4 is a perspective view of the novel heat shield of FIG. 2 with parts broken away to show a pair of ablative cells which form part of the heat shield.
Figure 5:
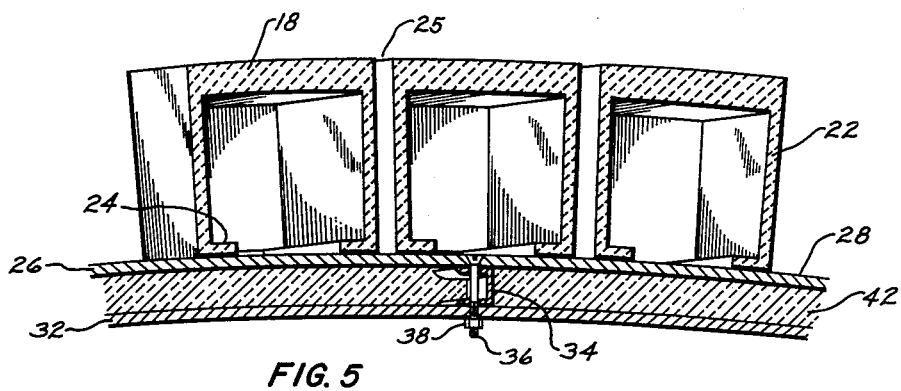
FIG. 5 is a sectional view of cells of the novel heat shield of FIGS. 1-4, depicting one manner in which the cells are secured to a structural member of the vehicle.

Referring now to the drawings, there is shown in FIG. 1 a space vehicle 12 for interplanetary travel having one embodiment of the novel heat shield 14 in accordance with this invention mounted on the forebody of the vehicle.

The heat shield 14 is shown in greater detail in FIGS. 2–5 and comprises cells 16 made of quartz which is transparent to radiative heat. The cells of course could also be made of silica, silicon dioxide, or other refractory oxides which are transparent to radiative heat. Each of the cells 16 has a relatively thick top wall 18 and thin side walls 22. The top wall 18 is shown in planar configuration but could be contoured to the shape of the vehicle. Integrally connected to the side walls of each cell is a flange 24 which is made of the same material as the cells. Separating the adjacent side walls of each cell is a small air gap 25 (exaggerated for purposes of illustration) which allows the top and side walls to expand upon heating.

A heat sink 26 provides structural rigidity for the heat shield and has a metallic reflecting layer 28 coated on the outer surface. The layer 28 is a thin coating of a material such as gold, silver, aluminum, rhodium, or similar reflective metal. Alternatively, the layer 28 could be made of metal foil instead of a coating.

The flange 24 of each cell is bonded to the reflecting layer 28 by an epoxy or other high temperature cement. The enclosure formed by the cells and the heat sink may be completely evacuated so that when the vehicle is travelling in space where there is no air pressure, the cells will not have a tendency to separate from the heat sink. Alternatively, a small hole could be made in one of the walls of each cell so that the pressure in the enclosure formed by the cell will be the same as the pressure on the outside of the cell.

The heat sink 26 is connected to the bulkhead or other vehicle member 32 by means of stiffeners 34 which may be made of a structural metal such as aluminum or titanium. The stiffeners are secured to the heat sink 26 by means of the countersunk bolt 36 and nut 38 and may be bolted or riveted to the vehicle member 32. Although the stiffeners 34 may form small direct heat paths from the heat sink to the bulkhead, the amount of heat transferred to the bulkhead through the stiffeners would be small. If desirable, however, insulated means could be used to attach the stiffeners 34 to further retard the transfer of heat to the bulkhead.

To protect the interior of the vehicle from heat which may be accumulated by the heat sink, the area between the heat sink and the vehicle member is filled with a layer of insulating material 42. Such material could be in the form of fibrous or powder insulation, tiny glass spheres, or multiple layers of foil such as aluminum foil.

As has been previously mentioned, upon entry into an atmosphere a region of high temperature gas is formed around the vehicle. Heat is transferred from the gas to the vehicle in the form of both radiative heat and convective heat.

Initially, the major component of heat to the vehicle is the radiative heat, while the majority of the convective heat will occur after the initial stages of entry. Since the cells 16 are transparent to radiative heat, the radiative heat passes through the cells 16 and strikes the reflecting layer 28. The layer reflects most of the radiative heat away from the space vehicle, limiting the extent to which this type of heat can affect the materials present. When the convective heating finally does occur the properties of the transparent material comprising the cell 16 may tend to degrade and become less transparent, but since most of the radiative heating to be encountered has already been reflected away from the vehicle, the material degradation will not materially affect performance of the heat shield.

A certain amount of heat reaching the layer 28 will not be reflected or otherwise dissipated, but will be absorbed by the reflecting layer 28 and transferred to the heat sink 26. The heat sink will thus retain a certain amount of heat which has not been disposed of by the quartz structure or the reflecting surface. However, the size of the heat sink needed is small compared to what would be needed should all the heat have to be absorbed by a heat sink, thus allowing a considerable saving of weight.

As the convective heat is produced and reaches the quartz cells, the quartz eventually begins to liquefy near the surface and part of the liquid subsequently vaporizes. Most of the convective heat is then dissipated as latent heat in the phase change of the quartz and is also transported away from the surface by convection in the liquid and gas quartz layers. The thick top wall 18 of the cell is spaced from the reflecting layer 28 on the heat sink by means of the thin side walls and further, because of the small size of the gap 25 between each of the cells 16, the convective heat cannot readily pass through to the reflecting layer 28 and hence to the heat sink. The width of the gap 25 is determined by the expansion characteristics of the quartz or other material used for the cells 16 and the amount of time required for reentry. However, the gap must be as small as possible to minimize the transfer of convective heat through the gap. In other words, the size of the gap 25 is dependent upon the temperatures that will be reached. For prolonged reentries where high temperatures may be attained, a larger gap is necessary to allow the material sufficient room for expansion. The length of the side walls 22 is also dependent upon the conductivity of the material chosen and by the amount of time of reentry. These walls should be made sufficiently long and thin to minimize the heat transferred to the reflecting layer 28 by conduction through the walls. Further, the evacuation of the enclosure formed by the cell retards transfer of convective heat from the cell walls to the reflecting layer.

The insulating material 42 forms a final heat barrier between the heat source and the inner structure of the space vehicle. The insulating layer could be replaced by water or other well known fluid coolant systems, but such insulating procedures are well known and need not be described in detail.

Figure 6:
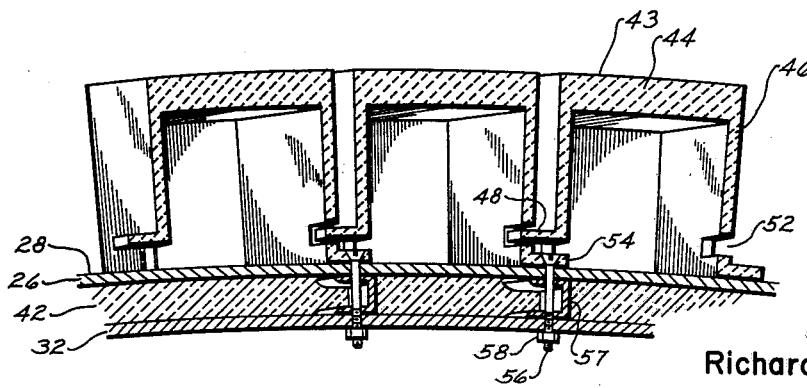
FIG. 6 is a view similar to FIG. 5 showing an alternate manner of attaching the cells to the structural member of the vehicle.

Referring now to FIG. 6, there is shown an alternate embodiment for mounting the cells to the structure of the vehicle. Each of the cells 43 comprises a top wall 44 and side walls 46. Two of the side walls of each cell bear a flange 48 which fits into a slot 52 of the adjacent cell. The other two side walls of each cell contain slots for mating with the respective flanges of the adjacent cells. As in the embodiment of FIG. 5, the side walls of the cell are integrally formed with a flange 54 contoured to the heat sink at the reflecting layer 28. A countersunk bolt 56 fits through the flange 54, heat sink 26, stiffener 57, and bulkhead 32 and is secured thereto by means of a nut 58. The embodiment of FIG. 6, while it is not airtight as is the arrangement of FIG. 5, offers a more mechanically secure arrangement because of the interlocking of the cells by means of the flange and slot arrangement.

While the heat shield 14 has been depicted as a group of four-sided cells, other configurations such as triangular, rectangular, or hexagonal shaped cells could be used. Moreover, where a small nose cone is utilized, a single quartz cap could be used instead of the cell structures.

Further, while the reflecting layer 28 has been described as a coating or layer on the outer surface of the heat sink 26, by polishing the outer surface of a heat sink made of a metal such as gold, silver, or aluminum so that the outer surface would be highly reflective to radiative heat, this heat sink can be made to act as both the heat sink and a reflecting surface.

While the heat sink has been shown as a separate structure attached to the bulkhead, the bulkhead and heat sink could be integrally combined in a common structure.

While the heat shield is shown to cover only the forebody of the vehicle where the greatest amount of heat will be transferred from the shock layer to the vehicle, the novel heat shield could, of course, be used to cover the entire vehicle.

Moreover, while the heat shield has been described for use with interplanetary space vehicles, the heat shield could also be used for thermal protection of objects, and in other instances where large amounts of heat comprising radiative and convective heat components are present.

It should be understood that the foregoing disclosure relates only to preferred embodiments of the invention and that it is intended to cover all changes and modifications of the examples in the invention herein chosen for the purposes of the disclosure which do not constitute departures from the spirit and scope of the invention.

What is claimed and desired to be secured by Letters Patent is:

1. In combination:

a space vehicle having a bulkhead and adapted to enter an atmosphere at velocities wherein substantial components of both radiative and convective heat will be created and transferred to said bulkhead and then to the interior of said vehicle, and a heat shield for substantially retarding the transfer of heat to the interior of said vehicle, said heat shield comprising:

(1) a metallic heat sink secured to and having a contour similar to that of said bulkhead, (2) a layer of heat insulation material interposed between said heat sink and said bulkhead for retarding the transfer of heat from said heat sink to the bulkhead of said vehicle, (3) a metallic reflecting layer mounted on the outer surface of said heat sink for reflecting away from said vehicle radiative heat transferred to said vehicle, and (4) an ablative structure highly transparent to radiative heat mounted on said reflecting layer and said heat sink, and forming the outermost portion of said heat shield, for dissipating convective heat transferred to said vehicle while simultaneously retarding the transfer of heat by conduction through the ablative structure to the interior of said vehicle, said ablative structure comprising a plurality of cells, each of said cells having a relatively thick top wall and thin side walls, said top wall arranged in a plane substantially parallel to said heat sink and adapted to dissipate said convective heat, said side walls arranged in a plane substantially normal to said top walls, said side walls being spaced from adjacent side walls of adjacent cells by a thin gap, and cooperating interlocking means joining at least one of said side walls of each cell to at least one of said side walls of an adjacent cell.

2. In combination:

a space vehicle having a bulkhead and adapted to enter an atmosphere at velocities wherein substantial components of both radiative and convective heat will be created and transferred to said bulkhead and thence to the interior of said vehicle, and a heat shield for substantially retarding said heat from reaching the interior of said vehicle, said heat shield comprising:

(1) a metallic heat sink secured to the bulkhead of said vehicle and having a contour similar to that of said bulkhead, (2) a metallic reflecting layer mounted on the outer surface of said heat sink for reflecting away from said vehicle radiative heat transferred to said vehicle, and (3) an ablative structure transparent to radiative heat mounted on said reflecting layer and forming the outermost portion of said heat shield for dissipating convective heat transferred to said vehicle while simultaneously retarding the transfer of heat by conduction to the interior of said vehicle, said ablative structure comprising a plurality of cells, each of said cells having relatively thick outer forward walls and relatively thin side walls connecting said outer forward walls to said reflecting layer, said outer forward wall, side wall, and reflecting layer together defining an enclosure, said side walls being spaced from adjacent side walls of adjacent cells by a thin gap.

3. In combination:

(1) a space vehicle adapted to enter an atmosphere at velocities wherein substantial components of both radiative and convective heat will be created and transferred to a bulkhead proximate to the entry surface of said vehicle and thence to the interior of said vehicle, and (2) a heat shield for substantially retarding the transfer of said heat to the interior of said vehicle, said heat shield comprising:
   (a) a metallic heat sink secured to said bulkhead of said vehicle and having means for reflecting radiative heat away from said heat sink and space vehicle, and
   (b) an ablative structure highly transparent to radiative heat mounted on said heat sink and forming the outermost portion of said heat shield for dissipating convective heat transferred to said vehicle while simultaneously retarding the transfer of heat by conduction to the interior of said vehicle, said ablative structure comprising a plurality of interlocking but separate cells each spaced in close proximity to its adjacent cells.

4. Heat shield apparatus for a space vehicle where, upon entry of said vehicle into an atmosphere, components of radiative and convective heat are formed which sheath the vehicle, said heat shield comprising:
   a metallic heat sink forming an outer covering of said vehicle,
   a relatively thin layer of reflective material mounted on an outer portion of said heat sink wherein substantial quantities of said radiative component of heat sheathing said vehicle are reflected away from said vehicle upon striking said reflective material, and
   a plurality of cells each having a top wall and side walls, said top wall forming the outermost boundary of said vehicle and one end of side walls being attached to said top walls, and the other end of said side walls being attached to said reflective material, each of said cells being spaced apart from the adjacent cell by a gap so as to allow for expansion of said cells due to heating,
   said top wall being sufficiently thick to allow said top wall material to liquify, thereby changing phase, and dissipate the convective heat in the phase change of the top wall material.

5. In a space vehicle adapted to enter an atmosphere at velocities wherein substantial components of both convective heat and radiative heat will be produced upon entry and transferred to said vehicle, the combination therewith of means for dissipating said components of convective heat and radiative heat comprising:
   a highly reflective layer on an outer member of said vehicle positioned so that radiative heat striking said layer will reflect away from said vehicle, and
   a plurality of cells transparent to said radiative heat attached to said reflective layer and adapted to dissipate said convective heat, each of said cells having a top wall and side walls, said side walls spacsaid top wall from said reflective layer so that little convective heat can be transferred to said reflective layer by conduction, and a gap separating each of said cells to allow sufficient room for the cells to expand due to heating.

6. In a space vehicle adapted to enter a planetary atmosphere wherein substantial components of both radiative heat and convective heat are transferred to the vehicle from a shock layer of gas formed upon entry into the atmosphere by said vehicle, the improvement comprising:
   a heat shield including a heat sink forming an outer structural layer of said vehicle and being provided with a highly reflective surface over at least a portion thereof where said radiative heat directed toward said vehicle is of the greatest magnitude, whereby said radiative heat will be reflected away from said vehicle by said reflective surface, and
   an ablative structure carried by said vehicle outwardly of said heat sink and comprising material highly transparent to radiative heat, said ablative structure preventing most of said convective heat from reaching the outer structural layer of said vehicle.

7. A heat shield adapted to provide thermal protection against large amounts of both radiative and convective heat comprising:
   a highly reflective metallic layer for reflecting radiative heat, and
   means transparent to said radiative heat for dissipating said convective heat while simultaneously retarding convective heat from being transferred by conduction to said metallic layer, said heat dissipating means comprising a plurality of ablative cells each defined by a top wall and side walls, one end of each of said side walls being secured to said reflective layer, the side walls of adjacent cells being spaced from each other to allow for expansion of said cells due to heating, yet allowing very little of said convective heat to reach said reflective layer.

8. A heat shield in accordance with claim 7 and further comprising a heat sink forming a structural support member for said heat shield and wherein said reflective layer is positioned on said heat sink wherein heat input to the shield which is not reflected by said reflective layer or dissipated by said heat dissipating means will be absorbed by said heat sink.

9. A heat shield adapted to provide thermal protection against large amounts of both radiative and convective heat comprising:
   a heat sink forming a structural support member for said heat shield,
   means for reflecting said radiative heat comprising a highly reflective metallic layer mounted on an outer surface of said heat sink, and
   means transparent to radiative heat secured to said reflective layer for dissipating said convective heat while simultaneously retarding convective heat from being transferred by conduction to said metallic layer, said heat dissipating means comprising at least one ablative cell defined by a top wall and side walls, said side walls being secured at one end to said top wall and at the other end to said reflective layer, whereby said heat sink will absorb heat not reflected by said reflective layer or dissipated by said ablative structure.

10. Apparatus in accordance with claim 9 wherein the space defined by said cell is evacuated.

11. A heat shield adapted to provide thermal protection against large amounts of both radiative and convective heat comprising:
   means for reflecting said radiative heat comprising a highly reflective metallic layer, and
   means mounted on said reflective layer for dissipating said convective heat while simultaneously retarding convective heat from being transferred by conduction to said metallic layer, said heat dissipating means comprising an ablative structure highly transparent to said radiative heat.

12. A dual-heat-shielded space vehicle comprising: a vehicle body including a forward bulkhead adapted to be subjected to the impingement of both radiative heat and convective heat upon entry into an atmosphere; a heat reflector carried by said body and covering at least a major part of said bulkhead; and an ablative structure carried by said body and located outward of said reflector to dissipate convective heat; said ablative structure being highly transparent to radiative heat.

13. The combination as claimed in claim 12, said ablative structure being spaced forwardly a sufficient distance from said reflector to minimize the transfer of convective heat from said ablative structure to said reflector and said body.

14. The combination as claimed in claim 13, said reflector being spaced forwardly from said bulkhead.

15. The combination as claimed in claim 14, and a layer of insulating material arranged between said reflector and said bulkhead.

16. The combination as claimed in claim 15, said reflector including a heat sink to absorb the radiative heat not reflected by said reflector.

References Cited in the file of this patent
UNITED STATES PATENTS 2,556,470    Del Mar _____ June 12, 1951

OTHER REFERENCES

"Aviation Week," June 22, 1959, page 163.
"Space 1 Aeronautics," February 1962, pp. 64–68.